(12) United States Patent
Fitzgerald et al.

(10) Patent No.: US 6,611,503 B1
(45) Date of Patent: Aug. 26, 2003

(54) METHOD AND APPARATUS FOR MULTIMEDIA CONFERENCING WITH DYNAMIC BANDWIDTH ALLOCATION

(75) Inventors: John Francis Fitzgerald, Slough (GB); James Gerald Kamitses, Wellesley, MA (US); Glenn William Stewart, N. Chelmsford, MA (US)

(73) Assignee: Tandberg Telecom AS (NO)

( * ) Notice: Subject to any disclaimer, the term of this patent is extended or adjusted under 35 U.S.C. 154(b) by 0 days.

(21) Appl. No.: 09/083,488

(22) Filed: May 22, 1998

(51) Int. Cl.[7] .......................... H04L 12/16; H04N 7/173
(52) U.S. Cl. ........................................ 370/260; 725/95
(58) Field of Search ................................ 370/230, 231, 370/232, 260, 261, 263, 264, 265, 270, 278, 431, 468, 477; 379/202

(56) References Cited

U.S. PATENT DOCUMENTS

| | | | |
|---|---|---|---|
| 4,558,180 A | * 12/1985 | Scordo | 179/18 BC |
| 4,710,917 A | * 12/1987 | Tompkins et al. | 370/62 |
| 4,847,829 A | * 7/1989 | Tompkins et al. | 370/62 |
| 5,231,649 A | 7/1993 | Duncanson | 375/38 |
| 5,386,466 A | * 1/1995 | Bales et al. | 379/220 |
| 5,463,629 A | 10/1995 | Ko | 370/110.1 |
| 5,559,798 A | 9/1996 | Clarkson et al. | 370/60.1 |
| 5,574,724 A | 11/1996 | Bales et al. | 370/68.1 |
| 5,590,127 A | * 12/1996 | Bales et al. | 370/260 |
| 5,598,416 A | 1/1997 | Yamada et al. | 370/468 |
| 5,673,253 A | 9/1997 | Shaffer | 370/229 |
| 5,680,392 A | 10/1997 | Semaan | 370/261 |
| 5,687,095 A | * 11/1997 | Haskell et al. | 364/514 |
| 5,717,857 A | * 2/1998 | Burkman et al. | 395/200.04 |
| 5,729,532 A | 3/1998 | Bales et al. | 370/261 |
| 5,751,338 A | * 5/1998 | Ludwig, Jr. | 348/17 |
| 5,796,724 A | 8/1998 | Rajamani et al. | 370/263 |
| 6,073,192 A | * 6/2000 | Clapp et al. | 710/65 |
| 6,081,513 A | * 6/2000 | Roy | 370/260 |

FOREIGN PATENT DOCUMENTS

| | | | |
|---|---|---|---|
| GB | 2313250 A | 11/1997 | H04N/7/15 |

OTHER PUBLICATIONS

ITU Draft Recommendation T.120: Data Protocols for Multimedia Conferencing, (14 pages) (Feb., 1996).

W. J. Clark; "Protocols for Multimedia Conferencing –An Introduction to the ITU–T.120 Series" ; Multimedia Transport and Teleservices; International Cost 237 Works Proceedings, Nov. 1994.

* cited by examiner

*Primary Examiner*—Alpus H. Hsu
*Assistant Examiner*—Toan Nguyen
(74) *Attorney, Agent, or Firm*—Hamilton, Brook, Smith & Reynolds, P.C.

(57) ABSTRACT

The specification discloses a multimedia conferencing service capability for dynamically allocating transmission link bandwidth among video, audio and data channels in response to changes in the utilization of those channels. The capability maximizes video quality when data is not being used and minimizes data transfer time when data is being used in a multimedia conference. A multipoint control unit (MCU) monitors the utilization of T.120 MLP data channels and changes the bandwidth allocation for all of the transmission links in response to changes in the utilization for at least one of the data channels. The utilization is monitored by measuring the data rate of outbound T.120 MLP data channels and comparing the measured data rate to the allocated bandwidth to determine the data channel utilization. The MCU controls and manages a service policy in which video quality is sacrificed in favor of data transfers to a majority of conference sites while conversely, video quality is favored over data transfer time for individual data needs. Since the dynamic bandwidth allocation is provided at the MCU, no changes or upgrades are needed at the endpoint multimedia terminals.

18 Claims, 8 Drawing Sheets

FIG. 6

METHOD AND APPARATUS FOR MULTIMEDIA CONFERENCING WITH DYNAMIC BANDWIDTH ALLOCATION

BACKGROUND OF THE INVENTION

Multimedia conferencing systems allow for simultaneous exchange of audio, video and data information among multiple conferencing sites. Systems known as multipoint control units (MCUs) perform switching functions to allow three or more sites to intercommunicate in a conference. The MCU links multiple conferencing sites together by receiving frames of digital signals from the sites, processing the received signals, and retransmitting the processed signals to appropriate sites. The digital signals may include audio, video, data and control information.

The ITU Recommendation T.120 series specifies data protocols for multimedia conferencing to provide conferencing applications such as file transfer, still image exchange and shared whiteboard. The T.120 protocol series includes infrastructure recommendations (network specific transport protocols, T.123; multipoint communications services (MCS), T.122/125; and generic conference control (GCC), T.124) and the application protocols that make use of the infrastructure. The T.120 series provides a data communications service in a multimedia conference. Many types of networks including PSTN, ISDN, CSDN and LAN are supported by the T.120 series.

At the base of the T.120 series infrastructure recommendations is the T.123 transport protocol profile which is specific to the underlying network. This profile provides reliable point-to-point data transport to the MCS layer above.

In a multimedia conference in which the conference sites connect to the MCU over digital links, the fixed bandwidth of the digital link is divided among the media types: video, audio, and data. The more bandwidth dedicated to video, the higher the video quality. Conversely, the more bandwidth dedicated to data, the faster the data transfer for such data applications as file transfer. These allocations between video, audio and data are generally fixed at the time the conference is initiated among the conference sites. While the video rate is generally constant, the data rate tends to be bursty. If the conference is initiated with too low a data bandwidth, data transfers can take too long during the conference. If the data bandwidth is set too high, the data channel may be underutilized for most of the conference with video quality being compromised.

SUMMARY OF THE INVENTION

A need exists for a capability that maximizes video quality when data is not being used and minimizes data transfer time when data is being used in a multimedia conference. The present invention provides a conference service capability that dynamically allocates link bandwidth among video, audio and data channels in response to changes in the utilization of those channels.

In accordance with the present invention, a method and apparatus for multimedia conferencing in a multipoint control unit provides dynamic bandwidth allocation among information channels of transmission links connecting plural conference sites to the multipoint control unit. The respective transmission links each have a first information channel and a second information channel with each conference site operable to transmit and receive first information (e.g., video) and second information (e.g., data) signals to and from other conference sites in the respective information channels. For each transmission link a first portion of the link bandwidth is allocated to the first information channel and a second portion is allocated to the second information channel. The MCU monitors the utilization of the second information channels and changes the bandwidth allocation for all of the transmission links in response to changes in the utilization for at least one of the second information channels.

Each information channel comprises inbound (i.e., inbound to the MCU) and outbound (i.e., from the MCU) channels. In a preferred embodiment, the utilization is monitored by measuring the data rate of information signals in the outbound channel and comparing the measured data rate to the allocated information channel bandwidth to determine the channel utilization. In an alternate embodiment, the data rate in the inbound channels can be measured.

The MCU changes the bandwidth allocation by decreasing the first portion allocated to the first information channel and increasing the second portion allocated to the second information channel in equal amounts when the utilization for a number of the second information channels rises above a high utilization threshold. When the utilization for a number of the second information channels drops below a low utilization threshold, the MCU reallocates the link bandwidth by increasing the first portion allocated to the first information channel and decreasing the second portion allocated to the second information channel. In alternate embodiments, utilization of either or both information channels can be monitored.

In an embodiment, the MCU reallocates the link bandwidth by increasing data bandwidth and decreasing video bandwidth when the data channel utilization for a number of the data channels is above the high utilization threshold. The bandwidth is again reallocated in favor of video bandwidth when the data channel utilization for a number of the data channels is below the low utilization threshold. In an alternate embodiment, the MCU inhibits transmission of video signals from the sites when the video bandwidth is decreased. When the bandwidth is reallocated to increase video bandwidth, the MCU uninhibits video transmission from the sites.

In the preferred embodiment, the MCU controls and manages a service policy in which video quality is sacrificed in favor of data transfers to a majority of conference sites while conversely, video quality is favored. over data transfer time for data needs of individual sites.

With the dynamic bandwidth allocation of the present invention provided at an MCU, no changes or upgrades are needed at the endpoint multimedia terminals.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views.

FIG. 6 illustrates a user interface for scheduling conference options including MLP rate information.

DETAILED DESCRIPTION OF THE INVENTION

A preferred multimedia conferencing system is described in U.S. Pat. No. 5,600,646, the entire teachings of which are incorporated herein by reference. The system will now be described briefly herein followed by a description of the dynamic bandwidth allocation configuration of the present invention.

Figure 1:
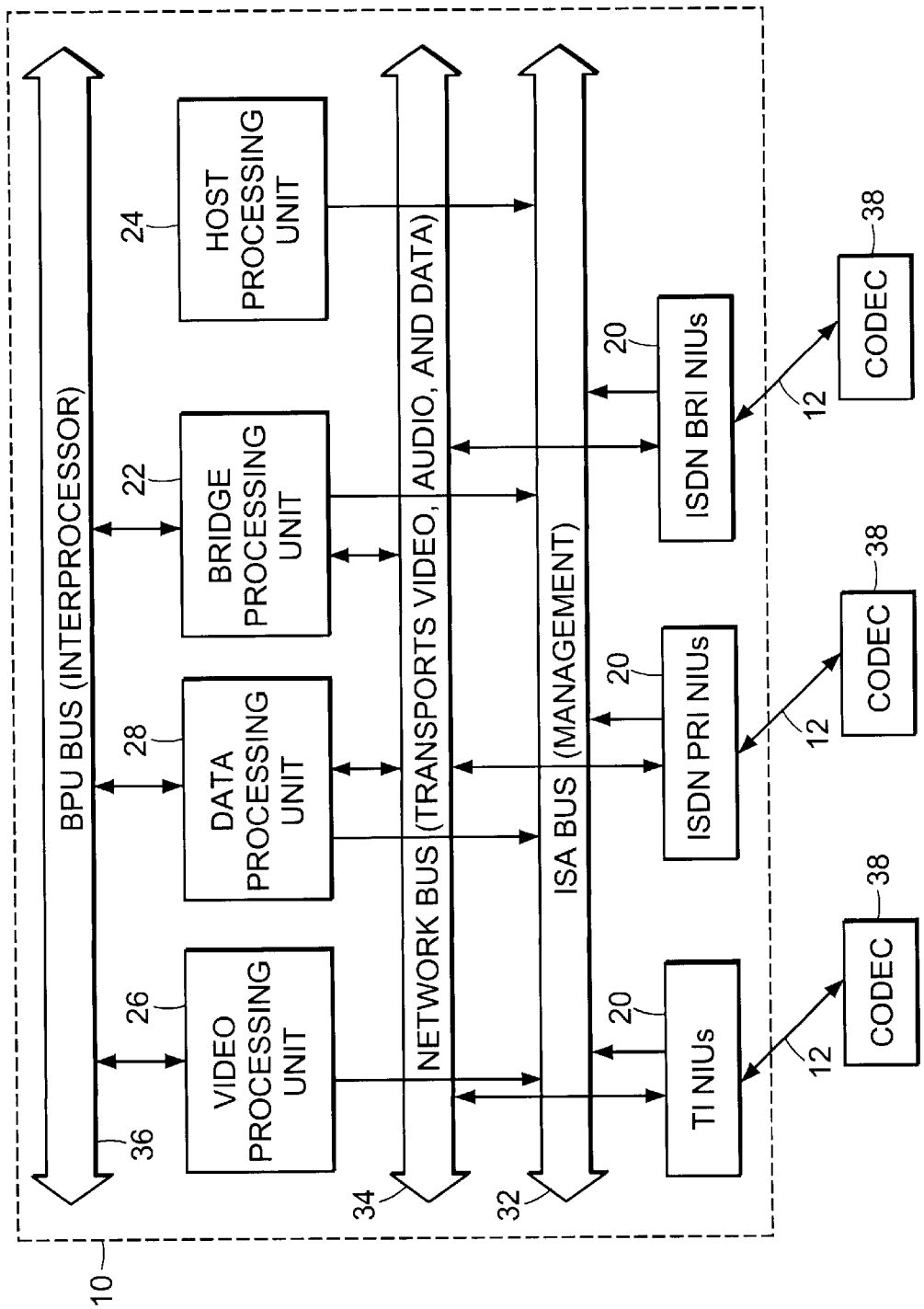
FIG. 1 is a block diagram of an MCU configuration.

FIG. 1 illustrates a multipoint control unit (MCU) 10. The major components in MCU 10 include at least one network interface unit (NIU) 20, at least one bridge processing unit (BPU) 22, a host processing unit (HPU) 24, an optional video processing unit (VPU) 26 and a data processing unit (DPU) 28. In addition to a host Industry Standard Architecture (ISA) bus 32, the MCU 10 includes a network bus 34 and a BPU bus 36. The network bus 34 complies with the Multi-Vendor Integration Protocol (MVIP) while the BPU bus 36 is a derivative of the MVIP specification. External multimedia terminals, or codecs 38, connect to the MCU 10 to form conferences.

Throughout the specification, the term "site" is used to refer collectively to a location having a multimedia terminal and a conference participant or user. It should be noted that the term "multipoint control unit" also encompasses a collection of networked multipoint control units.

The MCU operation will now be described at a high-level with respect to FIG. 1. Each codec 38, typically an ITU Recommendation H.320 multimedia terminal, connects to the MCU 10 over a transmission link 12 of a communications network. Unsynchronized digital data frames from each codec 38 are made available on the network bus 34 through NIUs 20. The BPUs 22 process the unsynchronized data frames from the network bus 34 to produce data frames aligned on an octet boundary which are made available to other BPUs 22 on the BPU bus 36. The BPUs 22 also extract audio information from the data frames. Each BPU 22 can support four codecs (multimedia terminals) and multiple BPUs may be connected through the BPU bus 36. The audio information is decoded to PCM data and made available on the BPU bus 36 for mixing with audio from other codecs 38 by respective BPUs 22 in a conference. The BPUs 22 combine compressed video information and mixed encoded audio information into frames which are placed on the network bus 34 for transmission to respective codecs 38. The DPU 28 performs processing functions to support multimedia terminals having T.120 enabled codecs as described further herein.

In a conference, the BPUs 22 perform video switching within a conference by selecting video data frames from timeslots on the BPU bus 36 and routing the frames to respective codecs 38 in the conference. A particular BPU 22 selects the appropriate video data frames based upon an MCU conference selection process. Typically, the selection process is based upon a comparison of the voice levels of the conference sites. The loudest conference site is designated the current broadcaster to be viewed by all other conference locations while the current broadcaster typically views another site. In alternative conference selection processes, an MCU operator or a particular multimedia terminal operating in a chair control mode selects a site as the current broadcaster.

In cases where the multimedia terminals operate at different transmission rates or with different compression algorithms or are to be mixed into a composite image, the video data is further processed by the VPUs 26 before it returns through the BPUs. The VPUs 26 extract compressed video information from the aligned data frames on the BPU bus 36. The compressed video information is decoded and placed on a pixel bus local to each VPU 26. The decoded video information on the pixel bus is made available for encoding in the VPU 26 for algorithm transcoding, spatial mixing, and transmission rate matching applications. The encoded video information is then placed on the BPU bus 36 for further processing by the BPUs 22 as in the typical conference arrangement.

The HPU 24 provides a management interface to one or more workstations for MCU operations. Through the HPU 24, an operator can control and manage the operation of the other components. The HPU 24 controls the setup and establishment of conferences, and performs monitoring and maintenance functions. As described further hereinbelow, the HPU 24 also controls and manages dynamic bandwidth allocation across the conference sites.

Each NIU 20 connects the MCU 10 to codecs 38 across a transmission link 12, e.g., T1, ISDN PRI, ISDN BRI. The NIU 20 formats the digital data frames that pass between the MCU 10 and codecs 38 for transmission within the MCU 10 and across various communications networks. The frame structure for the data exchanged between the MCU 10 and the codecs 38 is defined in ITU Recommendation H.221. Each NIU 20 reformats the digital data frames from the incoming line to an internal MCU format that is independent of the individual codec interfaces to the communications network. The reformatted data is then multiplexed onto the network bus 34 for transmission to the BPUs 22.

Figure 2:
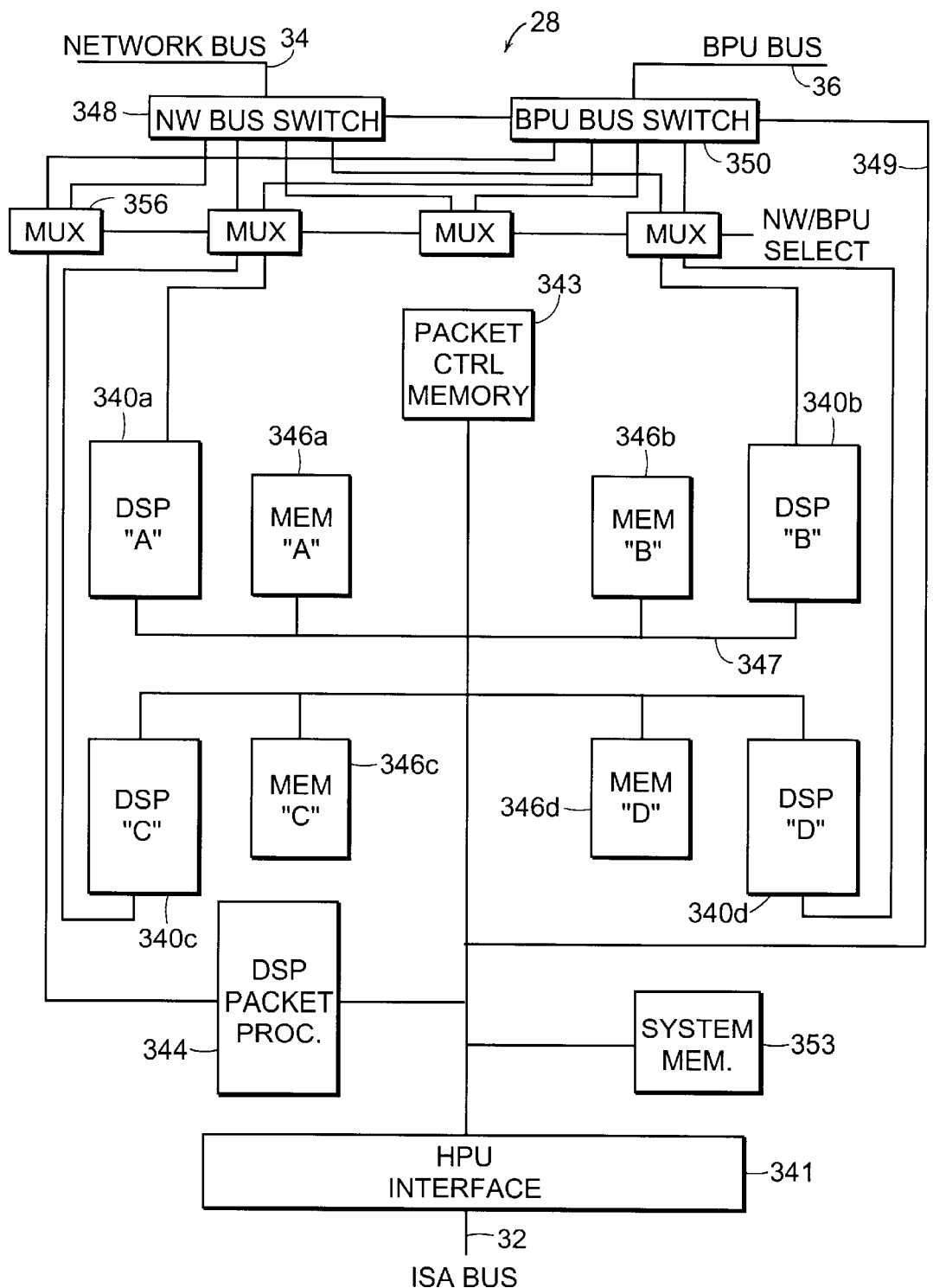
FIG. 2 is a schematic block diagram of an embodiment of a DPU.

The DPU 28 performs protocol handling of T.120 stacks for conferencing applications. Each DPU 28 can support twenty-four (24) codecs (multimedia terminals) and multiple DPUs can be connected through the BPU bus 36, similar to that used for BPUs 22. A detailed block diagram of the DPU 28 is illustrated in FIG. 2. The DPU 28 is segmented into four partitions (A, B, C, D), each partition having a Digital Signal Processor (DSP) 340 that supports up to six T.123 protocol profiles. Thus, the DPU 28 can support up to 24 endpoint terminals for T.120 conferencing. Each DSP 340 has a dedicated memory 346.

Each DPU 28 also includes a DSP for control and packet processing functions, a packet processor (PKP) 344. A system memory 353 is dedicated to the PKP 344. The PKP 344 controls a network bus switch 348 and a BPU bus switch 350 to direct selected packets from the network bus 34 and the BPU bus 36 respectively to the correct DPU partition (A, B, C, D). The network bus switch 348 can be implemented with two Mitel MT8980 Digital Switches, one switch each for transmit and receive. The BPU bus switch 350 can be implemented with Mitel MT8986AP digital switches. Additionally, multiplexers 356 connect the outputs of network bus switch 348 and BPU bus switch 350 to the DSPs 340, the PKP 344, and two HDLC controllers 354 and 355.

The DPU 28 has an HPU interface 341 which allows the NPU 24 (FIG. 1) to perform program download to the system memory 353 and I/O access to control the PKP 344 over ISA bus 32.

Data flow through the DPU 28 will now be described. Data packets which have been HDLC encoded by a transmitting multimedia terminal are received and demultiplexed from H.221 by a BPU 22 and placed onto the BPU bus 36. The packets are sent to the appropriate DSP memory 346a–d via the multiplexes 356. The PKP 344 programs the association of the serial input timeslots to the corresponding DSP memory 346a–d location.

The HDLC encoded data packets are decoded by the DSP 340. Decoded packets are processed by the DSP which also keeps statistics on errors, bytes processed and retransmissions. Packets to be sent to other codecs (multimedia terminals) are sent to the PKP 344 for routing to the other DSPs 340. Packets received from the PKP 344 by the DSPs 340 are HDLC encoded and transmitted to the appropriate BPU 22. The BPU adds the HDLC encoded packets to the H.221 multiplex in the MLP channel as described herein.

Having described the preferred multimedia conferencing system of FIG. 1, the dynamic bandwidth allocation configuration of the present invention will now be described.

Figure 3:
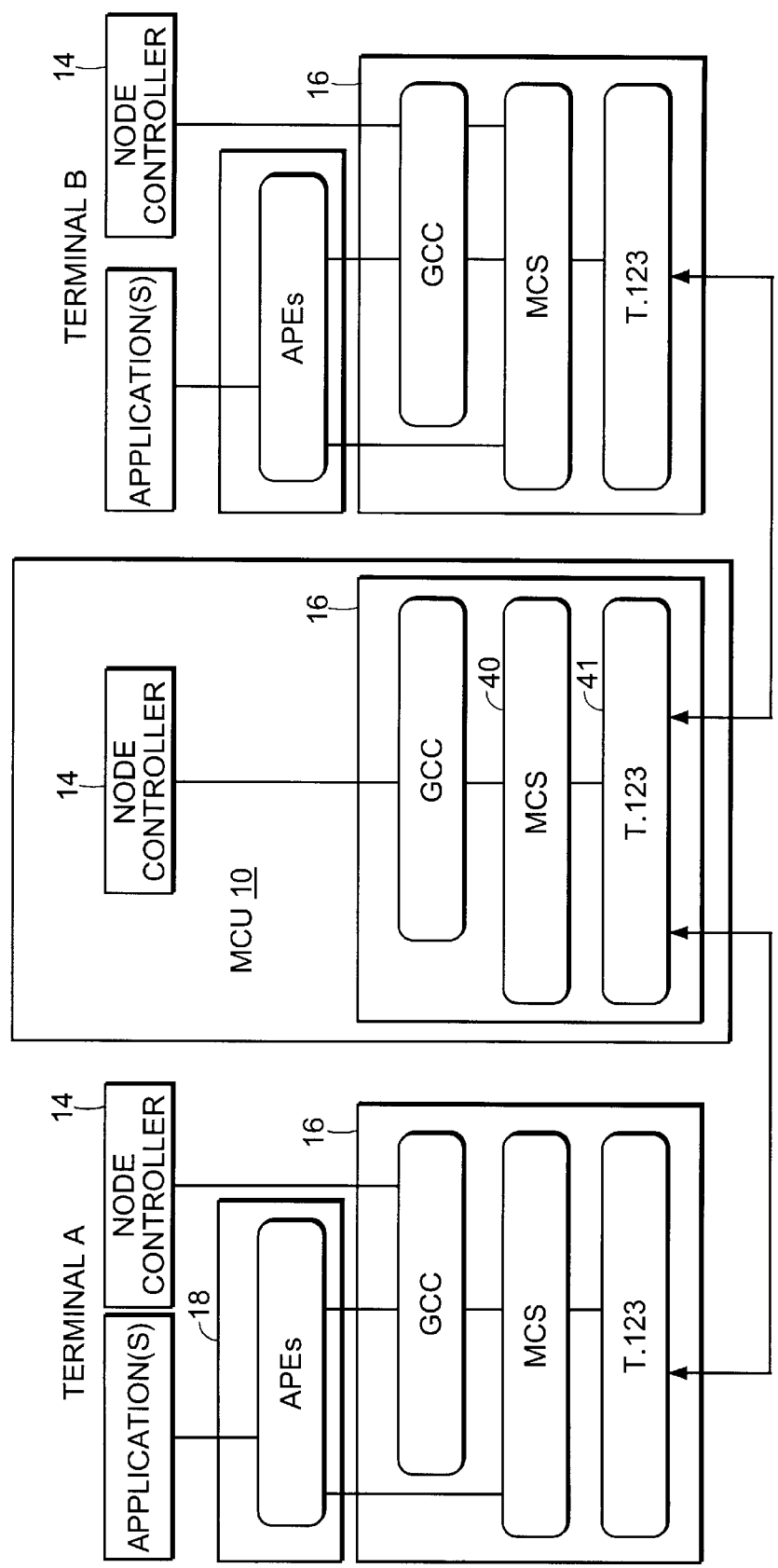
FIG. 3 is a block diagram of the T.120 protocol stack configuration in the MCU of FIG. 1.

The invention is described with respect to a preferred embodiment that implements the T.120 protocol stack. It will be apparent to those skilled in the art that other multimedia conferencing arrangements can exist or be configured that incorporate the principles of the dynamic bandwidth allocation of the present invention. Referring now to FIG. 3, an implementation of the T.120 protocol stack through the MCU 10 is shown. Terminals A and B are shown implementing the full T.120 protocol stack including the T.120 infrastructure 16 and the ITU standard application protocol entities (APEs) 18. The MCU 10 implements the T.120 communication infrastructure (T.123 transport protocol, MCS, and GCC). Each of terminal A, terminal B and the MCU 10 includes a node controller 14 that provides a T.120 management function.

Figure 4:
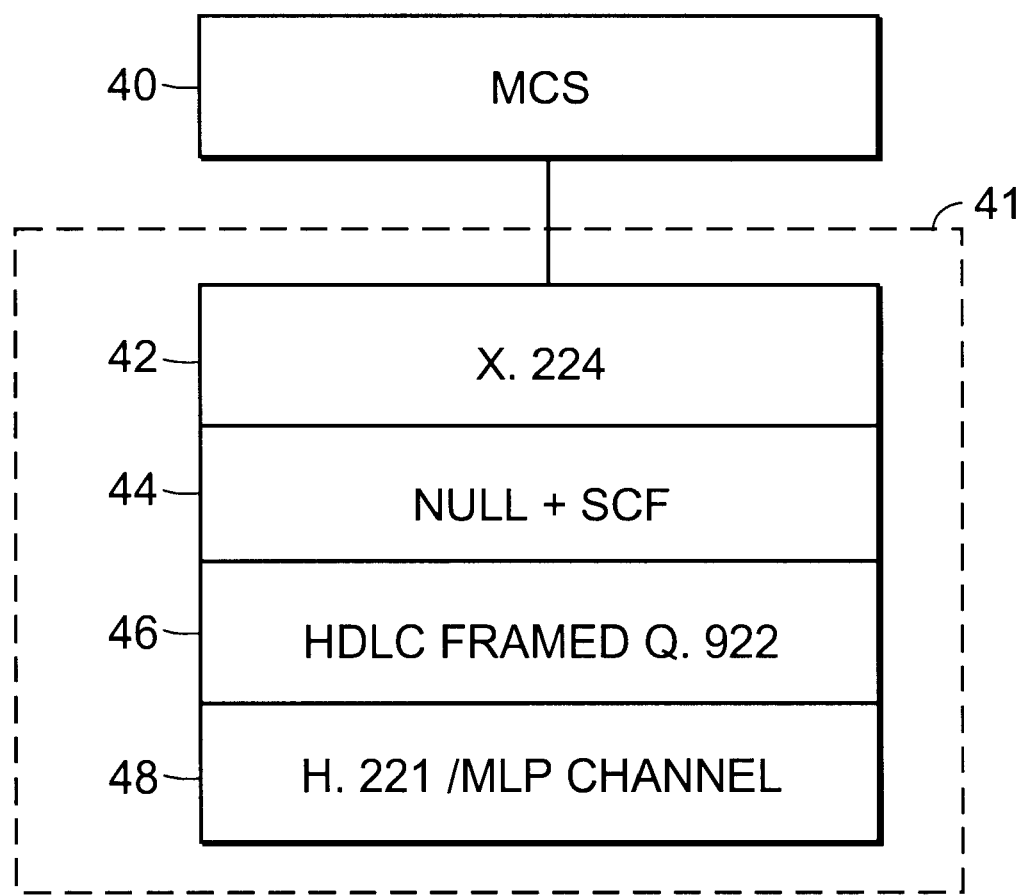
FIG. 4 illustrates a T.123 profile for ISDN implemented in the MCU of FIG. 1.

The T.123 profile for ISDN is shown in FIG. 4. The profile includes an X.224 network interface 42 to the MCS 40, SCF 44 for setup and control, Q.922 for reliable flow controlled data link services with HDLC for framing and fill stuffing and MLP 48 for raw bit connections.

The H.221 frame structure will now be described. The initial channel or I-channel is a 64 kilobits per second (kbps) channel structured into octets transmitted at 8 KHz (i.e., one octet every 125 microseconds which is the H.221 line period). Each bit position of the octets may be regarded as a subchannel of 8 kbps. The eighth subchannel is called the service channel (SC) and includes H.221 standard FAS and BAS information. The complete H.221 frame structure consists of 80 lines.

Figure 5A:
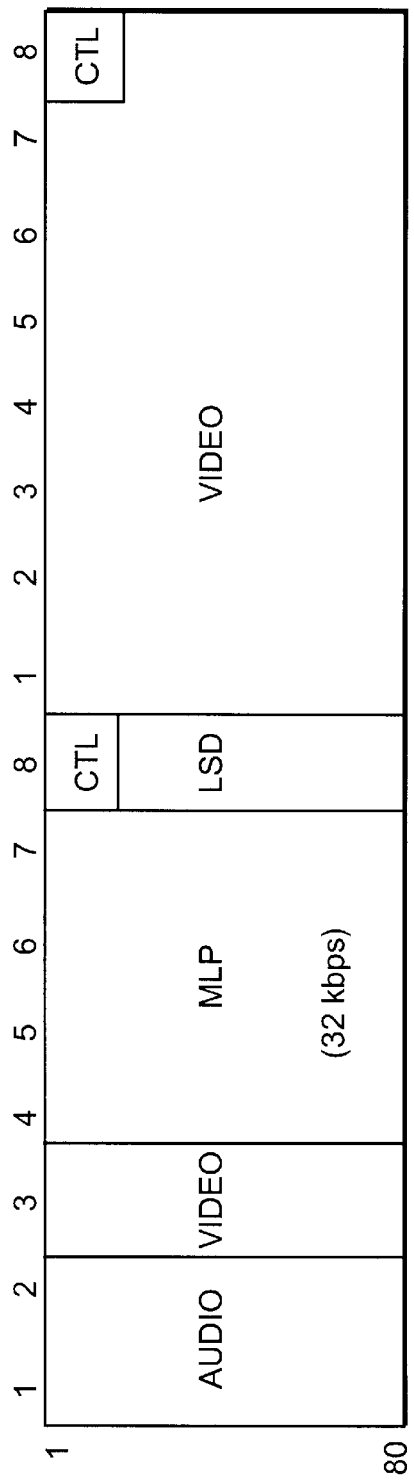
FIGS. 5A and 5B illustrate example H.221 frames for differing mixes of audio, video and data.
Figure 5B:
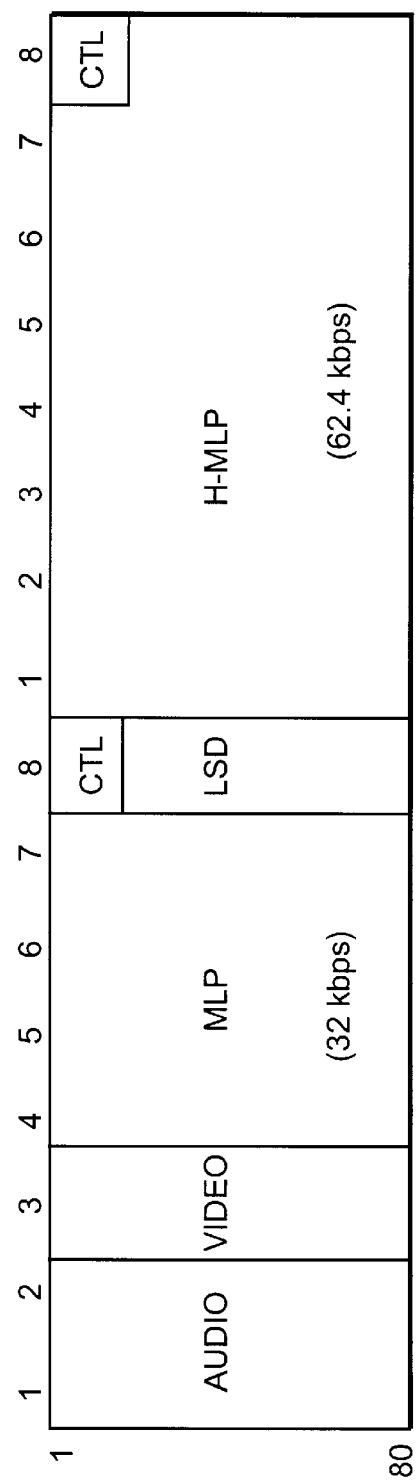

Referring now to FIGS. 5A and 5B, example H.221 frames for differing mixes of audio, video and data are shown. Both figures illustrate framing for basic rate ISDN in which two 64 kbps channels are provided. In FIG. 5A, audio defined by G.728 is placed in the first two columns of the I-channel. Video defined by H.261 is placed in the third column of the I-channel. MLP data at 32 kbps is placed in columns 4, 5, 6 and 7 of the I-channel. The remainder of the I-channel includes low speed data at 6.4 kbps and control information. The second channel or additional channel comprises all video in columns 1–7 and a portion of column 8.

Referring now to FIG. 5B, note that the I-channel is unchanged. However, the additional channel now contains H-MLP data at 62.4 kbps which replaces the video.

As noted in the background, the data rate, also known as the MLP rate in H.320, is chosen for the typical conference at conference initiation. Thus, in the typical conference arrangement, the MLP rate is a static rate. The static MLP rate chosen for the conference is typically negotiated at the conference setup based on the capabilities of the terminals entering the conference. It should be noted, however, that the static MLP rate may change during the conference only based upon terminals entering or leaving the conference that may have different data capabilities. In essence, terminals entering or leaving the conference with different capabilities can result in a renegotiation of the static MLP rate. Such renegotiations of the static MLP rate are effected by the HPU 24 sending an SCM MLP rate change command to the terminals.

In contrast, the present invention provides for a dynamic MLP rate capability wherein the MLP rate is adjusted to accommodate the needs of terminals to transfer data in the conference. In the preferred embodiment, two rates are provided: a minimum rate and a maximum rate. The minimum rate is selected to maintain T.120 connections and allow background data transfers among the conference terminals. A maximum rate is selected to provide burst data transfers. Operation at the maximum rate is, however, at the expense of video quality due to the fixed bandwidth of the ISDN or CSDN network links.

Figure 6:
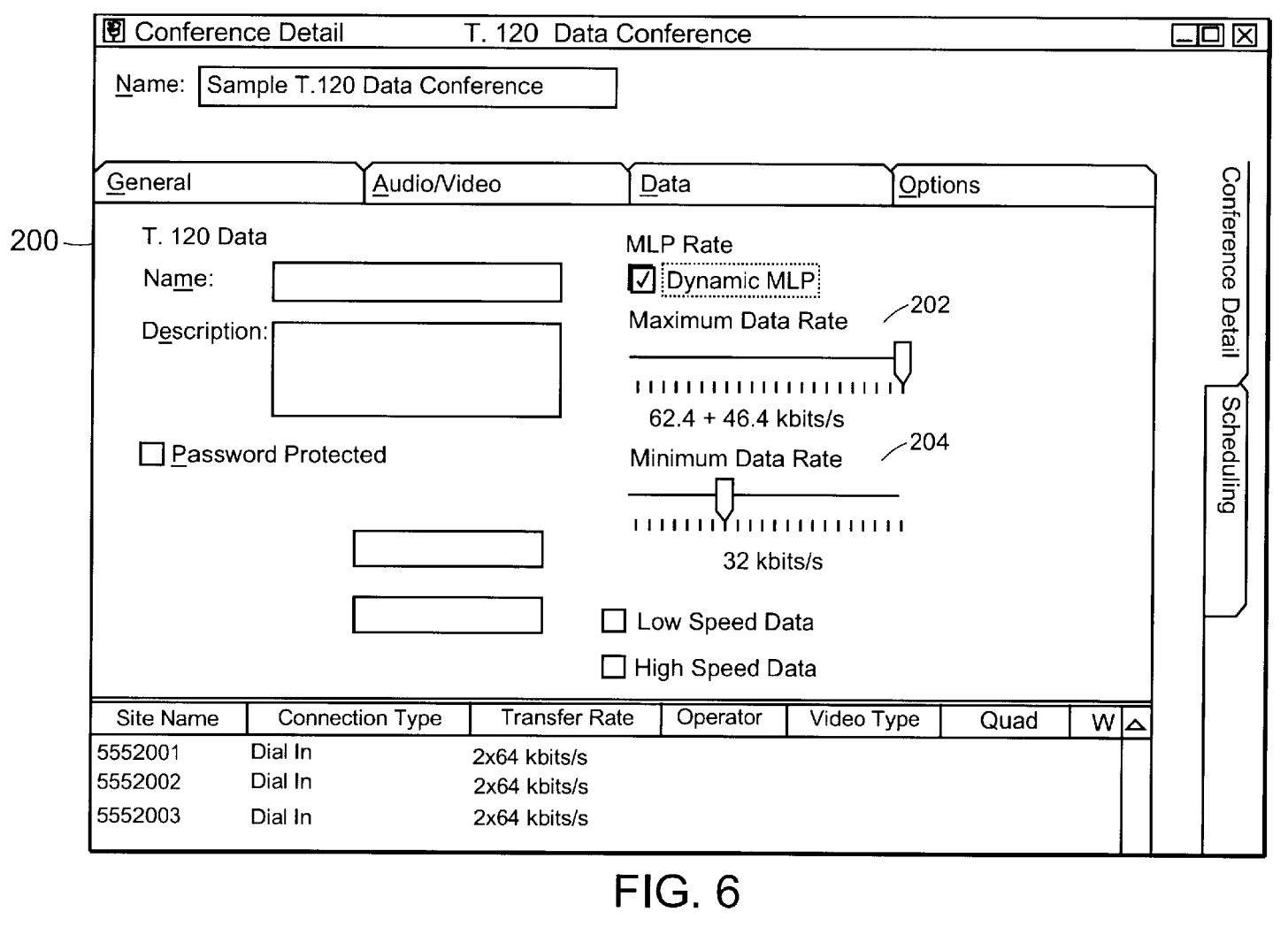

Referring now to FIG. 6, a user interface 200 for scheduling conference options including MLP rate information is shown. The user interface at the MCU provides for selecting a range for the MLP rate. The maximum and minimum data rates 202, 204 selected through the user interface serve as constraints between the actual maximum and minimum data rates that the MCU uses during the conference. For example, in a conference with a single BRI link, the maximum data rate 202 is 62.4+46.4 kbps. The minimum data rate 204 is 6.4 kbps. Other options provided through the user interface include a video refresh time parameter 206 for updating the video portion of the bandwidth after a conference has switched to the maximum MLP rate as described further herein.

As noted above, the conference definition allows for the specification of a desired range of MLP rates. The allowable rates for MLP are dependent on the overall transfer rate as well as the types of audio and LSD options chosen. At the start of the conference, the MCU collects the MLP data capabilities of the conference terminals during capability exchanges defined by H.320. A count of terminals capable of each MLP rate is established for the range of data rates in the conference. The MCU sets the conference maximum MLP rate to the highest value that a plurality of terminals can support not exceeding the conference defined maximum. Likewise, the MCU sets the conference minimum MLP rate to the lowest value that the terminals can support. "Plurality" is used in the sense that more terminals support the selected rate than do terminals at any other rate. Those terminals not capable of the conference rate are then set to receive the highest rate above the conference defined minimum that they can support and become secondary terminals as defined in the procedures of H.243.

Figure 7A:
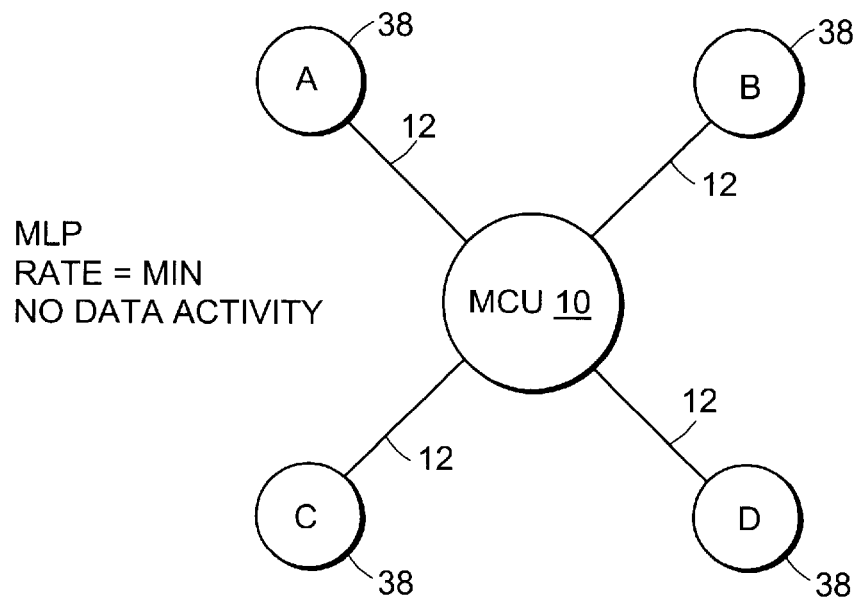
FIGS. 7A to 7D are block diagrams illustrating the dynamic bandwidth allocation of the present invention in a conference arrangement.

Referring now to FIG. 7A, a conference arrangement illustrating the principles of the dynamic MLP of the present invention is shown. Terminals A, B, C and D are shown in a conference connected to MCU 10 across ISDN BRI links 12. The terminals are configured for G.728 audio and H.261 video. At conference setup, the MLP data rates are selected with a minimum of 32 kbps and a maximum of 94.4 kbps. Initially, the bandwidth is allocated to favor the video bandwidth over the data bandwidth as shown in the H.221 frame of FIG. 5A. With this initial bandwidth allocation between video and data channels, the video channel at 70.4 kbps is of a relatively high quality while the MLP channel at 32 kbps has sufficient bandwidth for control messages and keeps the T.120 connections open. Note that the MLP channel can support multiple data link connections within the constraints of the T.120 protocol stack.

Figure 7B:
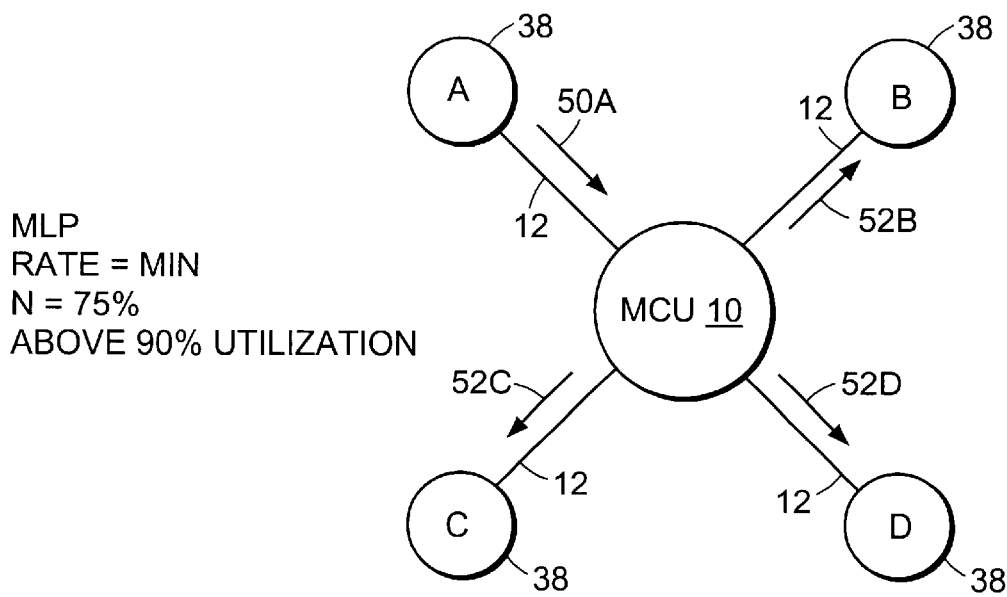

Referring now to FIG. 7B, terminal A is shown transmitting data on MLP data channel 50A to terminals B, C and D through MCU 10. The data from terminal A may represent, for example, a file transfer to terminals B, C and D. The data transfer from terminal A to the MCU fills the MLP data channel 50A to about the MLP channel capacity which is currently set at 32 kbps. At the same time, the MLP data channels 52B, 52C, 52D outbound to terminals B, C and D also fill to about the currently set capacity. As described further herein, the MCU 10 monitors the utilization of the MLP channel 52 for each of the outbound links to terminals A, B, C and D. Based upon a service policy described further herein, the MCU decides to increase the specified MLP rate to the maximum based upon the monitored utilization values. The MCU sends a control message to each of the terminals to reconfigure the H.221 framing to the maximum MLP data rate for the conference, which in this example is 94.4 kbps as shown in FIG. 5B.

Figure 7C:
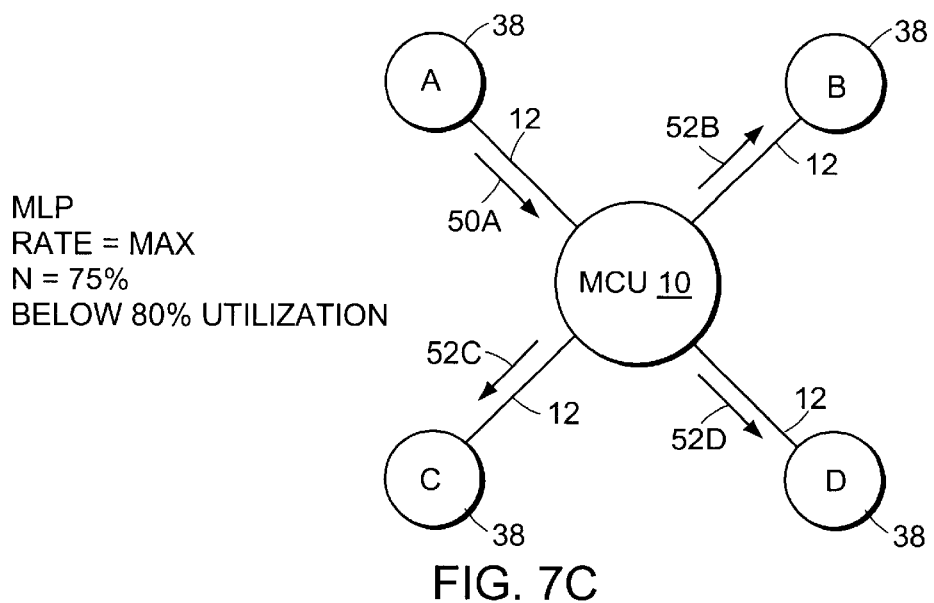
Figure 7D:
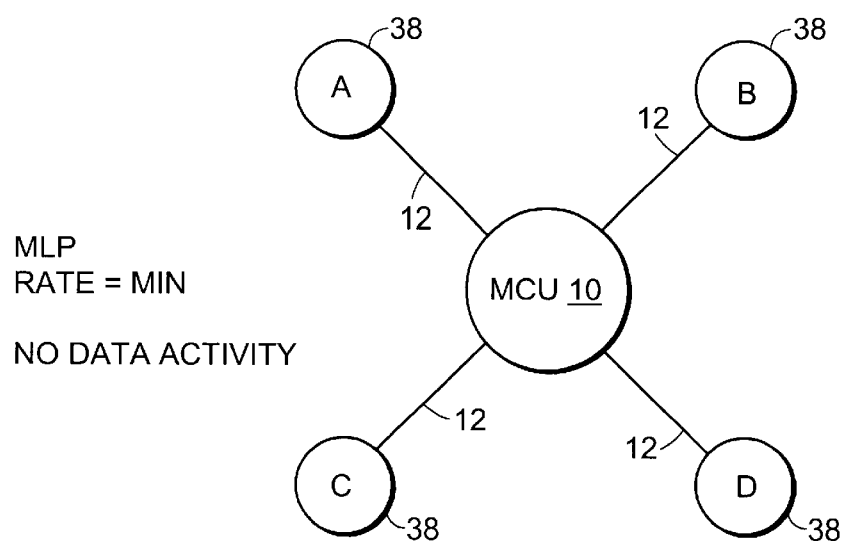

With the reallocation of bandwidth between video and MLP data, the data transfer from terminal A to terminals B, C and D is able to complete at a faster rate. The increase in data bandwidth comes at the expense of the video bandwidth and hence, video quality. When terminal A completes sending its data to terminals B, C and D, as shown in FIG. 7C, the MCU detects a drop in utilization of the MLP data channel. The MCU then decides to return the MLP data channel to the minimum rate. The MCU commands the terminals A, B, C and D to return to the minimum specified MLP data rate as shown in FIG. 7D.

In an alternate embodiment, the MCU inhibits transmission of video signals from conference sites when the video bandwidth is decreased below an acceptable level. When bandwidth is reallocated to increase video, the MCU uninhibits video transmission.

The process by which the MCU determines whether and when to change the MLP rate will now be described. As noted above, the MCU monitors the data activity on the MLP data channels. Specifically, the MCU monitors the utilization on outbound links to the terminals. The MLP data rate is increased to the maximum when the utilization on the outbound links to N percent of the sites is above a high threshold $T_H$, where N is a percentage of the sites that are active in the conference. In similar fashion, the MLP rate is decreased to the minimum when the utilization on outbound links to N percent of the sites is below a low threshold $T_L$. In an embodiment, N=50% and $T_H=T_L=90\%$. In an alternate embodiment, the MLP rate is decreased to the minimum when a time interval since video has been reduced in quality exceeds a video refresh time parameter set in the conference definition.

As noted above, the MCU 10 monitors the utilization of the MLP data channels. The monitoring function is performed in the DPU 28 with the monitoring status reported to the HPU 24. The HPU 24 receives the monitoring information from the DPU 28 and performs the dynamic bandwidth allocation in response to changes in the utilization of the MLP data channels.

To monitor utilization, the DPU 28 gathers the channel utilization status for each of the active ports of DSPs 340a–d (FIG. 2) at a sample period, which in the preferred embodiment is one second, and sends the status information to the HPU 24. A channel utilization message, referred to as the MLP_STATUS message, contains information about the MLP data channel for each of the active ports on the DSP 340. This information includes the number of bytes received and transmitted during the sample period.

The HPU 24 defines a control parameter for configuration of the dynamic bandwidth allocation algorithm of the present invention. The control parameter is defined as follows:

| Alias | Meaning | Range | Default |
|---|---|---|---|
| OTP_TSAMP | sample period (seconds) | 1–3 | 1 |
| OTP_WINDOW | samples used in sliding window | 1–10 | 5 |
| OTP_GTIME | guard time for switching to maximum MLP rate (seconds) | 1–255 | 5 |
| OTP_LEVEL | data rate threshold ($T_H$, $T_L$) (percent) | 1–100 | 90 |
| OTP_SCOUNT | site count threshold (N) (percent) | 1–100 | 50 |

The HPU 24 receives MLP_STATUS messages from the DPU 28 which provide utilization information for each of the ports on the DPU 28. Note that each DSP 340 on the DPU 28 will send one of these messages every sample period containing details of each active port on that DSP. Each time an MLP status message is received from a DSP 340, the HPU uses the information in the status message to determine whether or not a rate change is required, as shown by the following pseudo-code:

BEGIN hpu_tcm_mlp_status_report()
  FOR all the ports contained in this status report
    IF this port is not in a dynamic MLP conference
    THEN
      CONTINUE
    ENDIF
    IF not all ports in this conference are at the SCM MLP rate THEN
      Initialize a guard timer for this conference
      CONTINUE
    ENDIF
    IF there is a guard timer active on this conference THEN
      Decrement the guard timer
      CONTINUE
    ENDIF
    Calculate and save the effective transmit data rate for this sample
    Update the next sample pointer wrapping as necessary in the sliding window
    Calculate the new sliding window average effective data rate
    Convert this average to a percentage of the minimum MLP+H-MLP capacity
    IF this percentage is greater than the $T_H$ threshold THEN
      IF this port is not already marked as at max THEN
        Set the port status as above $T_H$ threshold
        Increment the count of ports at max for this conference
        Mark this conference as having changed status

```
    ENDIF
    ELSE If this port percentage is less than T_L threshold
       THEN
       IF this port is marked as at max THEN
          Clear the port status as above T_H threshold
          Decrement the count of ports at max for this
             conference
          Mark this conference as having changed status
       ENDIF
    ENDIF
ENDFOR
FOR all the active conferences
    IF the conference has changed status THEN
       Calculate the percentage of ports above the T_H
          threshold
       IF this percentage is greater than the site count thresh-
          old (N) THEN
          IF this conference is not already marked as at max
             THEN
             Set the conference status as at max
             Change MLP rate to max
          ENDIF
       ELSE
          IF this conference is marked as at max THEN
             Clear the conference status as at max
             Change MLP rate to min
          ENDIF
       ENDIF
    ENDIF
ENDFOR
END
```

The algorithm described above includes a mechanism to smooth the changes that may occur in implementing the dynamic bandwidth allocation. The smoothing mechanism includes a sliding window for determining an average effective MLP data rate. The guard time constrains the frequency of MLP rate changes.

EQUIVALENTS

While this invention has been particularly shown and described with reference to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A method for conferencing in a multipoint control unit, the method comprising the steps of:

connecting plural conference sites to the multipoint control unit, each conference site connecting over a respective transmission link having a first information channel and a second information channel and each conference site operable to transmit and receive first information and second information signals to and from other conference sites in the respective first information and second information channels;

allocating for each transmission link a first portion of the transmission link bandwidth to the first information channel and a second portion to the second information channel;

monitoring utilization of each second information channel; and changing the bandwidth allocation by reallocating the first portion and second portion between the first information and second information channels for all of the transmission links in response to changes in the utilization for at least one second information channel;

wherein each second information channel comprises an inbound data channel and an outbound data channel and the step of monitoring utilization includes measuring the data rate of second information signals in the outbound data channel and comparing the measured data rate to the allocated second information channel bandwidth to determine the data channel utilization.

2. A method for conferencing in a multipoint control unit, the method comprising the steps of:

connecting plural conference sites to the multipoint control unit, each conference site connecting over a respective transmission link having a first information channel and a second information channel and each conference site operable to transmit and receive first information and second information signals to and from other conference sites in the respective first information and second information channels;

allocating for each transmission link a first portion of the transmission link bandwidth to the first information channel and a second portion to the second information channel;

monitoring utilization of each second information channel; and changing the bandwidth allocation by reallocating the first portion and second portion between the first information and second information channels for all of the transmission links in response to changes in the utilization for at least one second information channel;

wherein the step of changing the bandwidth allocation includes decreasing the first portion allocated to the first information channel and increasing the second portion allocated to the second information channel in equal amounts when the utilization for a number of the second information channels is above a high utilization threshold.

3. The method of claim 2 further comprising increasing the first portion allocated to the first information channel and decreasing the second portion allocated to the second information channel in equal amounts when the utilization for a number of the second information channels is below a low utilization threshold.

4. A method for conferencing in a multipoint control unit, the method comprising the steps of:

connecting plural conference sites to the multipoint control unit, each conference site connecting over a respective transmission link having a video channel and a data channel and each conference site operable to transmit and receive video and data signals to and from other conference sites in the respective video and data channels;

allocating for each transmission link a first portion of the transmission link bandwidth to the video channel and a second portion to the data channel;

measuring the data rate of data signals in each data channel and comparing the measured data rate to the allocated data channel bandwidth to determine the data channel utilization for each data channel; and changing the bandwidth allocation by reallocating the first portion and second portion between the video and data channels for all of the transmission links in response to changes in the utilization for at least one data channel;

wherein each data channel comprises an inbound data channel and an outbound data channel and the measuring step includes measuring the data rate of data signals in the outbound data channel and comparing the measured data rate to the allocated data channel bandwidth to determine the data channel utilization.

5. A method for conferencing in a multipoint control unit, the method comprising the steps of:

connecting plural conference sites to the multipoint control unit, each conference site connecting over a respective transmission link having a video channel and a data channel and each conference site operable to transmit and receive video and data signals to and from other conference sites in the respective video and data channels;

allocating for each transmission link a first portion of the transmission link bandwidth to the video channel and a second portion to the data channel;

measuring the data rate of data signals in each data channel and comparing the measured data rate to the allocated data channel bandwidth to determine the data channel utilization for each data channel; and changing the bandwidth allocation by reallocating the first portion and second portion between the video and data channels for all of the transmission links in response to changes in the utilization for at least one data channel;

wherein the step of changing the bandwidth allocation includes decreasing the first portion allocated to the video channel and increasing the second portion allocated to the data channel in equal amounts when the data channel utilization for a number of the data channels is above a high utilization threshold.

6. The method of claim 5, further comprising increasing the first portion allocated to the video channel and decreasing the second portion allocated to the data channel in equal amounts when the data channel utilization for a number of the data channels is below a low utilization threshold.

7. The method of claim 5 further comprising inhibiting transmission of video signals from the sites when the data channel utilization for a number of the data channels is above the high utilization threshold.

8. The method of claim 7 further comprising increasing the first portion allocated to the video channel and decreasing the second portion allocated to the data channel in equal amounts and uninhibiting transmission of video signals from the sites when the data channel utilization for a number of the data channels is below a low utilization threshold.

9. The method of claim 7 further comprising increasing the first portion allocated to the video channel and decreasing the second portion allocated to the data channel in equal amounts and uninhibiting transmission of video signals from the sites after a time interval starting with the inhibiting step.

10. In a multipoint control unit having plural conference sites connected thereto over respective transmission links having a first information channel and a second information channel and each conference site operable to transmit and receive first information and second information signals to and from the other conference sites in the respective first information and second information channels, an apparatus comprising:

means for allocating for each transmission link a first portion of the transmission link bandwidth to the first information channel and a second portion to the second information channel;

means for monitoring utilization of each second information channel; and means for changing the bandwidth allocation by reallocating the first portion and second portion between the first information and second information channels for all of the transmission links in response to changes in the utilization for at least one second information channel;

wherein each second information channel comprises an inbound data channel and an outbound data channel and the means for monitoring utilization includes means for measuring the data rate of second information signals in the outbound data channel and means for comparing the measured data rate to the allocated second information channel bandwidth to determine the data channel utilization.

11. In a multipoint control unit having plural conference sites connected thereto over respective transmission links having a first information channel and a second information channel and each conference site operable to transmit and receive first information and second information signals to and from the other conference sites in the respective first information and second information channels, an apparatus comprising:

means for allocating for each transmission link a first portion of the transmission link bandwidth to the first information channel and a second portion to the second information channel;

means for monitoring utilization of each second information channel; and means for changing the bandwidth allocation by reallocating the first portion and second portion between the first information and second information channels for all of the transmission links in response to changes in the utilization for at least one second information channel;

wherein the means for changing the bandwidth allocation includes means for decreasing the first portion allocated to the first information channel and means for increasing the second portion allocated to the second information channel in equal amounts when the utilization for a number of the second information channels is above a high utilization threshold.

12. The apparatus of claim 11 further comprising means for increasing the first portion allocated to the first information channel and means for decreasing the second portion allocated to the second information channel in equal amounts when the utilization for a number of the second information channels is below a low utilization threshold.

13. In a multipoint control unit having plural conference sites connected thereto over respective transmission links having a video channel and a data channel and each conference site operable to transmit and receive video and data signals to and from other conference sites in the respective video and data channels, an apparatus comprising:

a control processor for allocating for each transmission link a first portion of the transmission link bandwidth to the video channel and a second portion to the data channel;

a data processing unit coupled to the data channels for measuring the data rate of data signals in each data channel and comparing the measured data rate to the allocated data channel bandwidth to determine the data channel utilization for each data channel; and wherein the control processor receives the data channel utilization for each data channel from the data processing unit and changes the bandwidth allocation by reallocating the first portion and second portion between the video and data channels for all of the transmission links in response to changes in the utilization for at least one data channel.

14. The apparatus of claim 13 wherein the control processor changes the bandwidth allocation by decreasing the first portion allocated to the video channel and increasing the second portion allocated to the data channel in equal amounts when the data channel utilization for a number of the data channels is above a high utilization threshold.

15. The apparatus of claim 14 wherein the control processor further changes the bandwidth allocation by increasing the first portion allocated to the video channel and decreasing the second portion allocated to the data channel in equal amounts when the data channel utilization for a number of the data channels is below a low utilization threshold.

16. A conferencing system comprising:
plural conference sites each coupled to a first end of a respective transmission link having a video channel and a data channel and each conference site operable to transmit and receive video and data signals to and from other conference sites in the respective video and data channels;
a multipoint control unit coupled to a second end of the respective transmission links, comprising:
a control processor for allocating for each transmission link a first portion of the transmission link bandwidth to the video channel and a second portion to the data channel;
a data processing unit coupled to the data channels for measuring the data rate of data signals in each data channel and comparing the measured data rate to the allocated data channel bandwidth to determine the data channel utilization for each data channel; and
wherein the control processor receives the data channel utilization for each data channel from the data processing unit and changes the bandwidth allocation by reallocating the first portion and second portion between the video and data channels for all of the transmission links in response to changes in the utilization for at least one data channel.

17. The system of claim 16 wherein the control processor changes the bandwidth allocation by decreasing the first portion allocated to the video channel and increasing the second portion allocated to the data channel in equal amounts when the data channel utilization for a number of the data channels is above a high utilization threshold.

18. The system of claim 17 wherein the control processor further changes the bandwidth allocation by increasing the first portion allocated to the video channel and decreasing the second portion allocated to the data channel in equal amounts when the data channel utilization for a number of the data channels is below a low utilization threshold.

* * * * *